United States Patent [19]

Munzner et al.

[11] 3,960,769

[45] *June 1, 1976

[54] CARBON-CONTAINING MOLECULAR SIEVES

[75] Inventors: Heinrich Munzner, Essen-Kray; Heinrich Heimbach, Bochum; Werner Korbacher, Essen-Borbeck; Werner Peters, Wattenscheid; Harald Juntgen, Essen-Heisingen; Karl Knoblauch, Essen; Dieter Zundorf, Essen-Heisingen, all of Germany

[73] Assignee: Bergwerksverband GmbH, Essen, Germany

[ * ] Notice: The portion of the term of this patent subsequent to Apr. 2, 1991, has been disclaimed.

[22] Filed: Feb. 21, 1974

[21] Appl. No.: 444,382

Related U.S. Application Data

[62] Division of Ser. No. 161,211, July 9, 1971, Pat. No. 3,801,513.

[30] Foreign Application Priority Data

Apr. 23, 1971 Germany............................ 2119829

[52] U.S. Cl.............................. 252/444; 252/421; 252/445; 423/579
[51] Int. Cl.$^2$......................................... C01B 13/00
[58] Field of Search.................. 252/421, 444, 445

[56] References Cited

UNITED STATES PATENTS

| | | | |
|---|---|---|---|
| 2,761,822 | 9/1956 | Addison | 252/445 X |
| 3,222,412 | 12/1965 | Mason et al. | 252/445 X |
| 3,793,224 | 2/1974 | Cooper | 252/442 X |
| 3,801,513 | 4/1974 | Munzner | 252/444 X |

*Primary Examiner*—Patrick P. Garvin
*Attorney, Agent, or Firm*—Michael J. Striker

[57] ABSTRACT

Process for preparing carbon-containing molecular sieves adapted for separating small molecular gases, in particular oxygen, from nitrogen, which comprises treating coke having a content of volatile components of up to 5% at 600° – 900°C with a hydrocabon which splits off carbon whereby the split-off carbon is deposited in the carbon framework of the coke thereby narrowing the existing pores.

7 Claims, 1 Drawing Figure

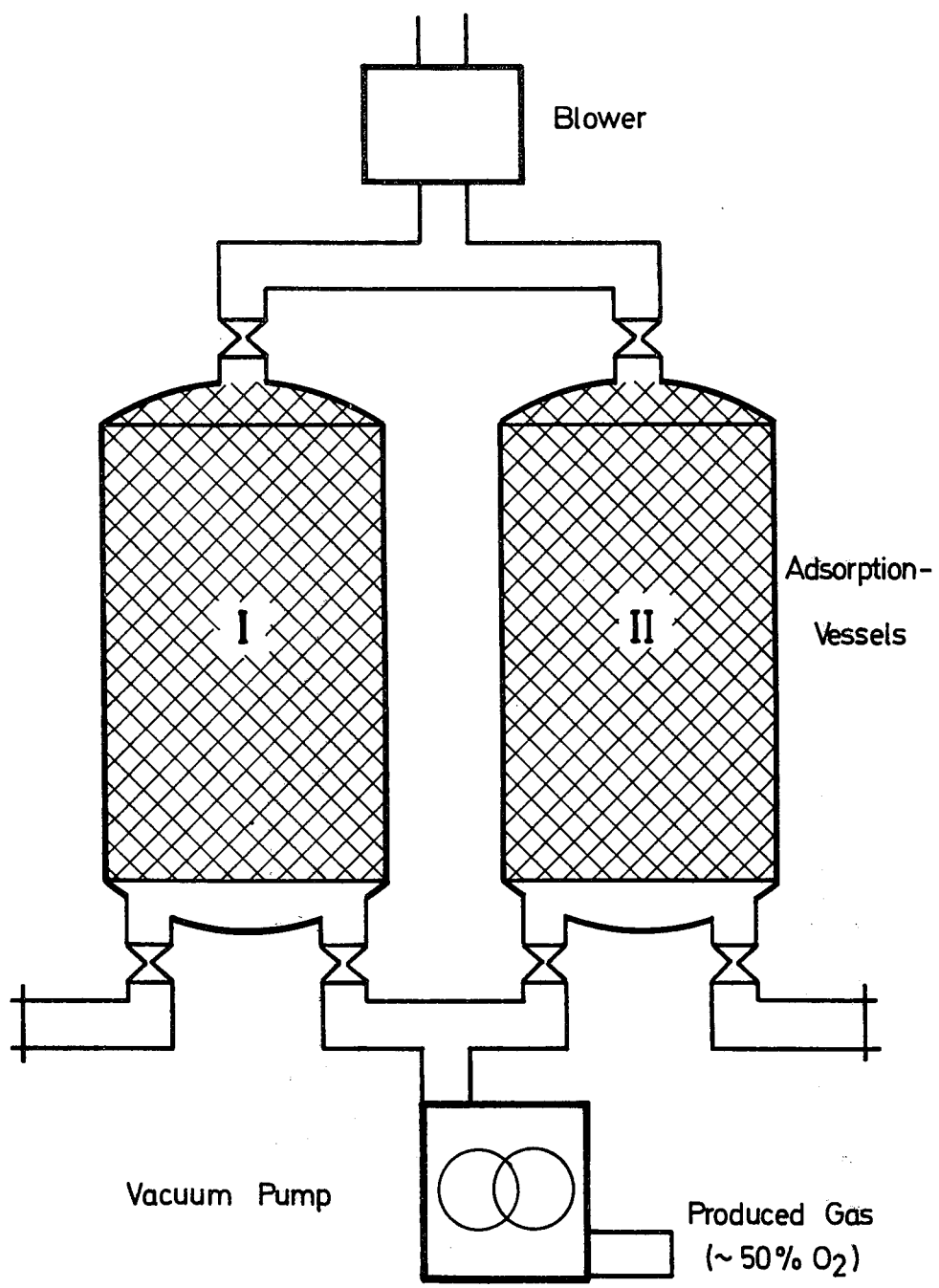

3,960,769

CARBON-CONTAINING MOLECULAR SIEVES

This is a division of application Ser. No. 161,211 filed July 9, 1971, now U.S. Pat. No. 3,801,513.

This invention relates to a carbon-containing molecular sieve and more particularly to a carbon-containing molecular sieve characterized by its ability to separate small molecular gases from gas mixtures containing the same.

The known silicate molecular sieves are possessed of the property that they can adsorb a single gas from gas mixtures containing the same. The carbon-containing molecular sieves such as those manufactured by pyrolysis of plastics e.g. polyvinylidene chloride, do not evidence any, or evidence only a very slight, selectivity respecting the adsorption of gases having similar gas kinetic molecular diameters, such as for instance oxygen and nitrogen, argon and oxygen or helium and methane. Therefore for carrying out a practical and technical scale separation of oxygen and nitrogen in air, the known carbon-containing molecular sieves are not suitable and especially so since it is difficult to obtain them in large amounts.

The object of the instant invention is to provide a new type of carbon-containing molecular sieve which is characterized in that it can for example adsorb oxygen from air more rapidly than nitrogen.

Another object of this invention is to provide a simple and economically feasible method of manufacturing such carbon-containing molecular sieves.

Still another object of this invention is to provide a method for the preparation of such molecular sieves which affords the possibility of setting up large-scale installations for gas separation procedures in connection with which these molecular sieves will be used in ton amounts.

Still another object of this invention is to provide a process for increasing the oxygen content of air to provide concentrations of up to 75% $O_2$.

These and other objects and advantages of the invention will become apparent from a consideration of the following disclosure.

In accordance with the invention it has now been found that coke having a content of volatile components of up to 5%, on being treated for a certain time at 600° – 900°C with a hydrocarbon which splits off carbon, results in the formation of molecular sieves of excellent quality. In accordance with the invention there is now provided a process for manufacturing carbon-containing molecular sieves for use in the separation of small molecular gases, in particular oxygen, from nitrogen, which comprises treating coke having a content of volatile components of up to 5% with a hydrocarbon which splits off carbon at 600° – 900°C whereby narrowing of the pores already present in the coke occurs. The finely dispersed carbon formed is deposited out in the pores of the coke and brings about a further decrease in the pore size of the coke's already relatively small pores.

To produce a molecular sieve type carbon suitable for separating oxygen from nitrogen, the average pore size of the ultra fine pore system must be below approximately 3 A after treatment. For separating even smaller gas molecules, this average pore diameter has to be even smaller. By changing the intensity of the treatment of the coke with hydrocarbons which split off carbon at 600° – 900°C, the average pore diameter can be adjusted according to the gas mixture to be separated therewith.

The quality and suitability of the coke thus produced can be established by passing air for a one minute period upwardly through a tube (1L) filled with the carbon-containing molecular sieves, the gas being conducted at a velocity of 30 cm/sec., and thereafter analyzing the adsorbed gas following desorption by vacuum filtering.

When tested as just set out, coke produced in accordance with the invention results in a gas having a composition of 35 or more volume % oxygen and 65 or less volume % nitrogen.

In order to obtain the desired constriction or narrowing of the pores, the treatment of the coke with the hydrocarbon is carried out for 1 to 60 minutes, or even longer. The cooling of the heated material is then carried out most advantageously in the treatment atmosphere. There can also be used during the cooling streams of an inert gas such as for instance, nitrogen. This accelerates the cooling and serves the additional purpose that the introduction of any oxygen is avoided during cooling.

As the coke, there is suitable for use in the process all forms of coke containing up to 5% volatile components such as cokes derived from mineral coal including anthracite, brown coal, peat, coconut shell and wood and also the known petroleum cokes, cokes prepared by the pyrolysis of plastics and active carbons. In order that the gases to be separated can pass through the molecular sieves it is advantageous in accordance with the invention that as the starting material there be used a coke having a designated particle size and in particular having a particle size of 0.1 – 20 mm.

As the hydrocarbon, there may be advantageously used in the treatment the exhaust gas of a coke-forming process, long distance illuminating gas, city gas, coking gas and all of the known hydrocarbons which are thermally decomposed with the splitting off of carbon such as benzene, toluene, xylene, naphthalene, methane, ethane, hexane, cyclohexane, ethylene, acetylene, methanol, ethanol, isopropanol, ethylene chloride and tetrachlorinated hydrocarbons.

Instead of using coke which is brought to the desired particle size through size reduction, there can also be used in accordance with the invention, coke formed and shaped to have the respective dimensions. In this connection, there come into consideration ball-, cylinder-, hollow cylinder- and egg-shaped coke particles as well as larger coke briquettes which are reduced to the required particle size. The manufacture of shaped coke particles can take place using various methods:

1. Coke and/or carbon is suitably formed into briquettes according to any desirable briquette-forming process, for instance by using 15 – 40% of a binding agent such as pitch, bitumin, tar or tar oil and coking the shaped bodies thus formed at 600° – 900°C. The briquetting can take place at normal temperature or elevated temperature using a stamping press, extrusion press or rolling press.

2. Carbon is shaped, if necessary in admixture with pitch, bitumin, tar or tar oil, pelletized to form balls of the desired size and these pellets then coked.

The treatment in accordance with the invention can be carried out by heating the cold coke under an inert gas stream to a temperature of up to 600° – 900°C and then, under a carbon splitting atmosphere, maintaining the coke at this temperature for prolonged periods.

Alternatively the treatment can be carried out directly after a coking of the starting material in the same or a different reactor. If the coking is carried out with starting materials containing pitch, bitumin, tar or tar oil, there are formed in the process large amounts of gaseous coking products during the heat treatment. As far as these coking products are not for example separated off with a rinsing or scavenger gas, the desired atmosphere is automatically adjusted so that the gaseous coking products already exert the same effect as a hydrocarbon which splits off carbon. In this case, it is possible to avoid introduction of at least a part of the hydrocarbon. Often the constitution of the coke can be modified through the additional introduction of a hydrocarbon and also in such cases there can be provided a further increase in the separating capacity of the coke.

Technical application of the molecular sieve type carbons which are intended to increase the oxygen content of air, or the content of another component in a known gas mixture, is further explained by the process illustrated in the drawing which forms a part of this disclosure. In the process, two adsorption vessels I and II are alternately charged with air and depleted of the accumulated oxygen by vacuum. The pressure during the charging phase is maintained at between 0 and 40 atm, desorption taking place at pressures ranging to a minimum of 20 Torr. The duration of the adsorption and desorption phases, respectively, is between 0.5 and 5 minutes. The gas volume necessary for the charge cycle amounts to 2 to 20 times that of the adsorption vessel.

The following Examples are given in order to more fully illustrate the invention and are in no manner to be construed as limiting the scope thereof.

EXAMPLE 1

77 Weight parts of mineral coal all of the particles of which have a particle size of less than 0.08 mm was treated in a fluidized bed with air having a temperature of 230°C so as to obtain an oxygen content of up to 12 weight %. Then, the coal was mixed with 23 weight parts of soft pitch (softening point according to Kraemer-Sarnow 52° – 56°C) with addition of water, the mixing taking place at about 70°C. The resulting mixture was placed in an extruder and formed into cylindrical bodies having a diameter of 2 mm. The formed bodies were then introduced into a rotating oven where, with exclusion of air, they were subjected to an average temperature increase of 10° per minute until a final temperature of 800°C had been obtained. At 750°C a nitrogen gas stream was introduced into the oven. After reaching a temperature of 800°C there was introduced together with the nitrogen gas stream 100 g benzene/$Nm^3$ and this treatment continued at constant temperature for 20 minutes. Thereafter, the bodies were cooled under pure nitrogen.

The test for evaluation of the resultant bodies as described above was carried out and there was produced a gas having the following composition: 54 volume % oxygen and 46 volume % nitrogen. When the test was repeated using, instead of air, a gas containing 50 volume % oxygen and 50 volume % nitrogen the composition of the resulting gas was to 83% oxygen and 17% nitrogen.

If instead of air, a gas mixture consisting of 23 volume % oxygen and 77 volume % Ar was used the final gas composition was 59% oxygen and 41% Ar.

EXAMPLE 2

77 Weight parts of mineral coal all of the particles of which have a particle size of less than 0.08 mm was treated in a fluidized bed with air at 230°C so as to obtain an oxygen content of up to 12 weight %. Then, the coal was mixed with 23 weight parts of soft pitch (softening point according to Kraemer-Sarnow 52° – 56°C) with addition of water at 70°C. The mixture was placed in an extrusion press and shaped into cylindrical bodies having a diameter of 2 mm and then treated, with exclusion of air, in a rotating oven, and with an average temperature increase of 10° per minute, until a final temperature of 800°C was reached. The thusly treated bodies had a volatile components content of 2%. Then, with the introduction of nitrogen, the bodies were cooled to room temperature.

The test for evaluating the bodies resulted in a gas having the following composition: 42 volume % oxygen and 58 volume % nitrogen.

EXAMPLE 3

80% anthracite, having 8% volatile components, and 20% bituminous coal, having 20.5% volatile components, have particle sizes of 0 – 0.5 mm with the finest particle component amounting to 55 – 60% and having a particle size of less than 0.06 mm. The coal was formed into balls with spraying of water and pelletized to a size of 3 mm. The pellets were heated in a rotating oven at 750°C to form coke by passing nitrogen thereover for 30 minutes, 100 g toluene per $Nm^3$ then being added to the gas stream. Coke having a volatile components content of 3% was obtained. Thereafter the coke pellets were cooled under an inert nitrogen gas stream.

The test for evaluating the coke yielded a gas of the following composition: 37 volume % $O_2$ and 63 volume % $N_2$.

EXAMPLE 4

76 Weight parts of wood coke all of the particles of which have a particle size of less than 0.1 mm were mixed with 4 weight parts of soft pitch (softening point according to Kraemer-Sarnow of 52°–56°C) with addition of water at about 70°C. The mixture was then introduced into an extrusion press and cylindrical shaped bodies having a diameter of 2 mm formed. The bodies were introduced into a rotating oven and were heated therein, with exclusion of air, at temperature increases amounting on the average to 10°C per minute until a final temperature of 800°C had been reached. Thereafter, with the introduction of nitrogen, the bodies were cooled to room temperature. The thusly formed product had a volatile components content of 1.5%.

The test for evaluating the quality of the bodies resulted in a gas having a composition of 38 volume % oxygen and 62 volume % nitrogen.

EXAMPLE 5

76 Weight parts of wood coke all of the particles of which have a particle size of less than 0.1 mm were mixed with 24 weight parts of soft pitch (softening point according to Kraemer-Sarnow of 52° – 58°C) with addition of water at about 70°C. The mixture was then introduced into an extrusion press and formed into cylindrical bodies having a diameter of 2 mm. The bodies were introduced into a rotating oven and, with exclusion of air, carbonized by increasing the temperature at an average of 10° per minute until a final temperature of 800°C had been reached. After a temperature of 750°C had been reached, a nitrogen gas stream was introduced and after a temperature of 800°C had been established isopropanol in an amount of 100 g/Nm³ was charged. The treatment in the isopropanol-nitrogen atmosphere lasted for 20 minutes. Thereafter the bodies were cooled under a pure nitrogen atmosphere.

When the test for evaluating the quality was carried out, a gas having a composition of 49 volume % oxygen and 51 volume % nitrogen was obtained.

EXAMPLE 6

Coconut shell material having a particle size of 1 to 3 mm was introduced into a rotating oven and heated up at a rate of 3° per minute until the temperature of 750°C had been reached and the volatile components content was 4.5%. This temperature was maintained constant for 30 minutes and during this time there was introduced into the oven a stream of ethylene gas. Thereafter the bodies were cooled under pure nitrogen.

When the evaluation test was carried out, a gas having a composition of 50.5 volume % oxygen and 49.5 volume % nitrogen was obtained.

EXAMPLE 7

75 Weight parts of mineral coal, the particle size of which was less then 0.08 mm for all of the particles, was preoxidized in a fluidized bed with oxygen at 230°C to obtain an oxygen content of 12 weight %. This product was mixed with 20 weight parts of soft pitch (softening point according to Kraemer-Sarnow of 52° – 56°C) with addition of water at about 70°C. This mixture was then introduced into an extrusion press and cylindrical shaped bodies having a diameter of 2 mm formed. The bodies were then charged into a rotating oven and heated therein, with exclusion of air, at an average temperature increase of 10°/min. until a final temperature of 800°C had been reached. Then, with the introduction of nitrogen, the bodies were cooled to room temperature. In a second treatment step, the product was again heated in nitrogen to 800°C. Then, low temperature carbonization gas obtained in a coking procedure was introduced into the nitrogen gas stream. After 30 minutes the bodies were cooled under nitrogen to room temperature.

The test for evaluating the quality of the bodies was carried out and a gas having a composition of 45 volume % oxygen and 55 volume % nitrogen obtained.

EXAMPLE 8

Peat coke was worked up to a particle size of 1 to 3 mm and heated in a rotating oven under nitrogen to 800°C. Then, gaseous toluene was introduced with the nitrogen gas stream and the temperature maintained constant for 30 minutes. Finally the bodies were cooled in pure nitrogen.

The test for evaluating the quality of the bodies produced a gas having a composition of 36 volume % oxygen and 64 volume % nitrogen.

The 2 adsorption vessels as shown in the drawing contain 20 m³ molecular sieve type carbon, manufactured according to Example 1. During the adsorption cycle 6000 m³ air, which has neither been dried nor freed of carbon dioxide, is charged through each of the adsorption vessels for periods of 100 seconds at a pressure of 1.05 atm. The desorption cycle also takes 100 seconds at a pressure of 50 Torr which is produced by suction. Through alternate operation of the two adsorption vessels a product containing 51% oxygen and 49% nitrogen will be recovered.

2 adsorption vessels, similar to those described in the drawing, are filled with 1000 ccm molecular sieve type carbon manufactured according to Example 6. Adsorption is achieved by pumping a gas volume of 28000 ccm, consisting of 5% He and 95% CH₄, alternately into each adsorption vessel, using a pressure of 40 atm. The time required amounts to 30 seconds. In the second step of the procedure the pressure is abruptly released to 1 atm. In step 3, desorption takes place at pressures reaching a minimum of 20 Torr by use of suction. 1000 ccm of gas containing 20% He and 80% CH₄ will be recovered.

What is claimed is:

1. A molecular sieve which adsorbs a gas of a first atomic or molecular size more readily than a gas of a larger second atomic or molecular size, said molecular sieve comprising coke having carbon deposited in the pores to reduce the pore size to an effective size less than about 0.3 millimicrons, and said molecular sieve being capable of adsorbing oxygen so much more readily than nitrogen that when air is passed through a confining space, having a volume of substantially 1 liter and substantially filled with said molecular sieve, for a period of about 1 minute and at a velocity of about 30 centimeters per second, subsequent desorption of the thus-adsorbed gas from said molecular sieve yields a gas containing a minimum of about 35 volume percent of oxygen.

2. A molecular sieve as defined in claim 1, wherein said coke is impregnated with finely dispersed carbon deposited in said pores, said carbon being effective for reducing the effective size of said openings of said pores.

3. A molecular sieve as defined in claim 1, wherein said coke is particulate.

4. A molecular sieve as defined in claim 3, wherein said coke comprises particles having a particle size between substantially 0.1 and 20 millimeters.

5. A molecular sieve as defined in claim 2, wherein said coke comprises particles having a particle size between substantially 0.1 and 20 millimeters.

6. A molecular sieve comprising interconnected coke particles having particle sizes between substantially 0.1 and 20 millimeters and constituting a porous lattice; and finely dispersed carbon deposited in the pores of said lattice and reducing the average effective size of the pores to less than 0.3 millimicrons so that, when air is passed through the pores of the molecular sieve, oxygen having a molecular diameter of less than 0.3 millimicrons is more readily adsorbed by the molecular sieve than other components of air having larger atomic or molecular diameters whereby the gas desorbed from a saturated molecular sieve contains at least 35 volume percent of oxygen.

7. A molecular sieve produced by heating coke particles having a size between substantially 0.1 and 20 millimeters and a volatile components content of at most about 5 percent in an inert atmosphere at a temperature between substantially 600° and 900°C while a gaseous stream of a carbonaceous substance which splits off carbon at said temperature is passed into contact with said coke particles for such a period between about 1 and 60 minutes that the carbon that is thus split off is deposited in the pores of said coke particles and reduces the effective average size of said pores to less than about 0.3 millimicrons.

* * * * *